United States Patent Office 3,290,266
Patented Dec. 6, 1966

3,290,266
COMPOSITIONS CONTAINING ELEMENTAL SULPHUR
Marion D. Barnes, Washington, D.C., and Arthur V. Tobolsky, Princeton, N.J., assignors, by mesne assignments, to Research Corporation, New York, N.Y., a non-profit corporation of New York
No Drawing. Filed Apr. 15, 1963, Ser. No. 272,836
5 Claims. (Cl. 260—30.8)

The present invention relates to compositions comprising elemental sulphur plasticized, or otherwise modified, with one or more polymers.

Broadly stated, the invention is based on the remarkable discovery that certain polymers can be used to effectively modify the characteristics of elemental sulphur. For example, one or more of these polymers may be added in relatively small amounts to molten sulphur to give a composition which can be shaped into sulphur forms, films or coatings of improved plasticity, impact resistance, color effects and the like. Apparently, the polymer functions in many instances as a modifier for the sulphur although the polymer addition may also operate in some other way to bring about the unique and advantageous characteristics described herein.

The polymer may be introduced in the form of colored or pigmented beads, filaments, etc., to impart desired color effects. If the colored or pigmented beads, filaments, etc., are comprised mainly of polymers which fall within the purview of this invention, then these desired color effects can be achieved without deleterious changes in the physical properties of the sulphur forms, films or coatings.

The polymers which are used herein, either singly or in various combinations, are all characterized by the fact that they absorb or dissolve a significant amount of sulphur when immersed in molten sulphur. The thus absorbed or dissolved sulphur appears to remain in a substantially unreacted form since it is essentially completely removed when the polymer is subjected to an appropriate solvent extraction. This absorbed or dissolved sulphur apparently remains for some time in the liquid state, even when the sulphur is cooled to below its melting point, although this is not necessarily the case and the invention is not limited to this explanation or understanding.

The polymers used herein, to be effective for present purposes, should absorb or dissolve molten sulphur to the extent that they show a weight percent increase of at least 2% when immersed in molten sulphur at 140° C. for a period of ten hours. Desirably, the weight percent increase may be of the order of 4–8% and may be approximately 15% or even higher. Polymers which fail to meet the indicated minimum weight pickup of 2% when immersed in molten sulphur at 140° C. for ten hours do not effectively modify rhombic sulphur and cannot be used herein. However, all polymers which take up at least 2% sulphur under the conditions indicated, whether linear or crosslinked, may be advantageously used to improve the characteristics of sulphur compositions, e.g. forms, films or coatings thereof, according to the present invention.

Another important characteristic of the polymers used herein is that they should not be completely soluble or completely insoluble in molten sulphur. The useful polymers are characterized by the fact that they are swellable or wettable by the molten sulphur.

Typically suitable polymers for use herein are the linear and crosslinked, crystalline or amorphous polymers (including copolymers) of: olefines such as ethylene, propylene and isobutylene; lower alkyl esters of acrylic and methacrylic acids such as ethyl acrylate, butyl acrylate, methyl methacrylate, butyl methacrylate, ethyl-hexyl acrylate and the like; vinyl and vinylidene monomers such as vinyl chloride, vinyl acetate, vinyl pyridine, acrylonitrile and styrene; and urethanes. Specific examples of such polymers include polyethylene of the conventional type as well as high density polyethylene, ethylene/propylene rubbers (typically the copolymers comprising 20 to 50% propylene and 80 to 50% ethylene), polypropylene, polyisobutylene, butyl rubber, polybutyl acrylate, copolymers of acrylonitrile with either butyl acrylate or ethyl hexylacrylate, copolymers of vinyl pyridine and butyl acrylate, polystyrene, polyvinyl acetate, polymethyl methacrylate, polyvinyl chloride, polyurethanes of the polyester and polyether type (e.g. tetrahydrofuran based urethane rubber), and hard and soft rubbers. In the case of the soft rubbers, such as natural rubber or GR-S, the rubber seems to first react with the sulfur to form a hard rubber which then swells in the sulphur to give the desired effect. Further examples include polymers containing sulphur atoms such as linear or crosslinked polyethylene tetrasulphide and similar polymers.

The polymer or polymers used herein may be of low or high molecular weight, e.g. from 1500 to several million molecular weight, as long as they demonstrate the characteristics mentioned heretofore, i.e. wettability or swellability with at least 2% weight pickup in molten sulphur under the conditions stated. They may be either linear or crosslinked, typical of the latter being crosslinked polyethylene tetrasulphide and hard rubber.

In preparing the modified sulphur compositions of the invention, the polymer or polymer mixture is preferably added to the molten sulphur in the form of fine particles, e.g. 0.1 to 10 microns average size, although if desired, other particle sizes or polymer forms, e.g. viscous liquids, polymer crumb or pellets, filaments, fibers or strips of film, may be used. The mixture of molten sulphur and polymer or polymers should be thoroughly stirred in order to obtain a uniform dispersion and the resulting product may be used immediately while in the molten state or cooled and remelted for subsequent use.

The amount of polymer added to the molten sulphur can be widely varied. Generally, however, the total polymer addition will fall within the range of 5 to 20%, based on the weight of elemental sulphur. The optimum amount in any specific case will depend on the nature of the polymer, its degree of sulphur pickup, and the desired uses for the ultimate composition.

The present invention may be used to advantageously modify the properties of the sulfur compositions described in U.S. applications Serial No. 248,902 and Serial No. 248,885. Thus, for example, a polymer or mixture of polymers as described herein may be incorporated in the highway marking compositions of Serial No. 248,885, in addition to, or in lieu of, the plasticizer used in said compositions. Typically, hard rubber dust may be dispersed uniformly in molten sulphur to take the place of conventional polysulphide plasticizers. The resulting composition may be used for highway marking purposes or the like to give films of improved plasticity and impact resistance.

The invention is illustrated but not limited by the following examples wherein parts and percentages are by weight unless otherwise stated:

*Example I*

This example illustrates the sulphur absorption or pickup characteristics of a variety of available polymers.

A bath of sulphur was melted and kept at a temperature of 140° C. Strips (2" x ¼" x ¹⁄₁₆") of the polymers listed in the following table were placed in the molten sulphur for a period of ten hours. After this treatment, the strips were removed and allowed to dry. The strips were weighed both before and after treatment. The weight gain for each polymer is tabulated below:

Polymer: Weight gain (percent)
- Polyethylene (M.P. 137° C., crystalline, high density) — 9.7
- Ethylene-propylene rubber — 8.1
- Polypropylene B (M.P. 175°., crystalline) — 2.9
- Polyisobutylene — 5.8
- Butyl rubber — 6.6
- Poly(butyl acrylate) — 5.4
- Poly(butylacrylate 80-acrylonitrile 20) — 4.9
- Poly(ethyl-hexyl acrylate 80-acrylonitrile 20) — 14.3
- Poly(ethyl-hexyl acrylate 60-acrylonitrile 40) — 5.0
- Poly(vinyl pyridine 40-butylacrylate 60) — 7.2
- Polystyrene — 7.4
- Polyvinyl acetate — 2.7
- Polymethyl methacrylate — 2
- Polyvinyl chloride — 2
- Ethyl cellulose — 1
- Polyethylene terephthalate (Mylar) — 1
- Nylon 6 — 0
- Ester based urethane rubber [1] — 2
- Tetrahydrofuran based urethane rubber [2] — 6
- Crosslinked polyethylene tetrasulphide — 40

[1] Available as Vulcallan.
[2] Available as Adiprene.

It is to be noted that of the above polymers, ethyl cellulose, polyethylene terephthalate and nylon demonstrated a weight pickup of less than 2% under the test conditions. Accordingly, these polymers, when mixed with molten sulphur in suitable form, e.g. as particles, strips or the like, give no major improvements in films or coatings prepared from sulphur and sulphur compositions as described in Serial No. 248,902 and Serial No. 248,885. For example, these films and coatings may demonstrate much lower impact resistance than the films and coatings obtained with unmodified sulphur or the sulphur compositions of the pending applications. On the other hand, the addition of 5–20% of one or more of the other polymers listed in the above table gives a significant improvement in the impact resistance or other properties of a film obtained by casting molten sulphur.

*Example II*

This example illustrates the preparation of polymer-modified compositions according to the invention.

5 parts of particulate high density polypropylene (average particle size 10 microns) were added to 100 parts molten sulphur at 140° C. The mixture was stirred for ten hours and the resulting composition in the molten state was then applied as a stripe on asphalt. The stripe after cooling demonstrated good impact resistance and other desirable characteristics.

*Example III*

The process of Example II was repeated using, in one case, hard rubber (ebonite) dust, and polystyrene granules (10 microns in size), in another with essentially equivalent results.

It will be appreciated that various modifications may be made in the invention described herein without deviating from the scope thereof as set forth in the following claims wherein we claim:

1. A composition consisting essentially of sulphur modified with from about 5 to about 20% by weight of a polymer, based on the weight of the sulphur, said polymer being selected from the group consisting of polymers and copolymers of olefins, lower alkyl esters of acrylic acids, lower alkyl esters of methacrylic acids, vinyl monomers, vinylidene monomers and urethanes, said polymer having a weight pickup of at least 2% when immersed in molten sulphur at 140° C. for ten hours.

2. The composition of claim 1 wherein the polymer is polyethylene.

3. The composition of claim 1 wherein the polymer is polypropylene.

4. The composition of claim 1 wherein the polymer is polyisobutylene.

5. The composition of claim 1 wherein the polymer is an ethylene/propylene copolymer.

References Cited by the Examiner

Hancock: Industrial and Engineering Chemistry, vol. 46, No. 11, November 1954, pages 2431 to 2434.

MORRIS LIEBMAN, *Primary Examiner.*

ALAN LIEBERMAN, *Examiner.*